United States Patent [19]

Graham

[11] 3,933,371

[45] Jan. 20, 1976

[54] OVERHEAD GUARD FOR LIFT TRUCKS

[75] Inventor: Frederick A. Graham, Bellevue, Mich.

[73] Assignee: Clark Equipment Company, Buchanan, Mich.

[22] Filed: Apr. 21, 1975

[21] Appl. No.: 570,288

[52] U.S. Cl. .............................. 280/150 C; 296/102

[51] Int. Cl.[2] .......................................... B60R 21/00

[58] Field of Search .................. 280/150 C; 296/102

[56] References Cited

UNITED STATES PATENTS

| | | | |
|---|---|---|---|
| 3,289,871 | 12/1966 | Tourneau et al. | 296/102 X |
| 3,536,353 | 10/1970 | Goodacre | 296/102 |
| 3,687,484 | 8/1972 | Cosby | 280/150 C |

*Primary Examiner*—Robert R. Song
*Assistant Examiner*—Michael J. Forman
*Attorney, Agent, or Firm*—John C. Wiessler

[57] ABSTRACT

A protective overhead guard device for lift trucks includes a rigid rear leg construction connected to the rear ends of the side members of the overhead guard canopy for adjustment pivotally to a plurality of positions, said connections to the side members being fixed and rigid. The lower ends of the legs connect to adjustable brackets for different longitudinal adjusted positions of the counterweight.

12 Claims, 5 Drawing Figures

OVERHEAD GUARD FOR LIFT TRUCKS

BACKGROUND OF THE INVENTION

The field of art to which the invention pertains includes vehicular protective overhead guards.

Driver overhead guard structures have generally been adopted as standard equipment on lift trucks for the protection of operators from falling objects under specified conditions. It is of advantage to maximize standardization of chassis design within a given range of truck lifting capacities by including means for adjusting the truck frame or counterweight in a longitudinal direction as a function of the maximum load to be handled in any given truck operation. Various constructions have heretofore been devised for this purpose, a relevant one of which is disclosed in assignee's U.S. Pat. No. 3,061,034.

It is also of advantage to provide an overhead guard device for such vehicles which provides adjustment means for varying the effective length thereof, either in combination with a longitudinally adjustable counterweight, as in the above-mentioned patent, or for different trucks having different capacities whether the counterweight of any given such truck is adjustable or not, and to which such an adjustable overhead guard is adaptable.

A previous design for a longitudinally adjustable guard for the above purpose is disclosed in assignee's U.S. Pat. No. 3,687,484.

SUMMARY

My invention is an improvement in adjustable overhead guard structure for industrial vehicles such as lift trucks. It is a primary object of the invention to provide an improved driver's overhead guard device for vehicles which provides improved adjustment means for varying the effective length of the guard device. The guard may also be used in combination with a longitudinally adjustable vehicle counterbalance or other device so that for any given adjusted location of the counterbalance or device within a predetermined range the guard device may be adjusted to maintain a structurally strong and rigid connected relationship to the counterbalance or device.

Other more particular objects and features of the invention will be apparent to those skilled in the art from the following description and drawing forming a part hereof.

DESCRIPTION OF THE PREFERRED EMBODIMENT

Figure 1:
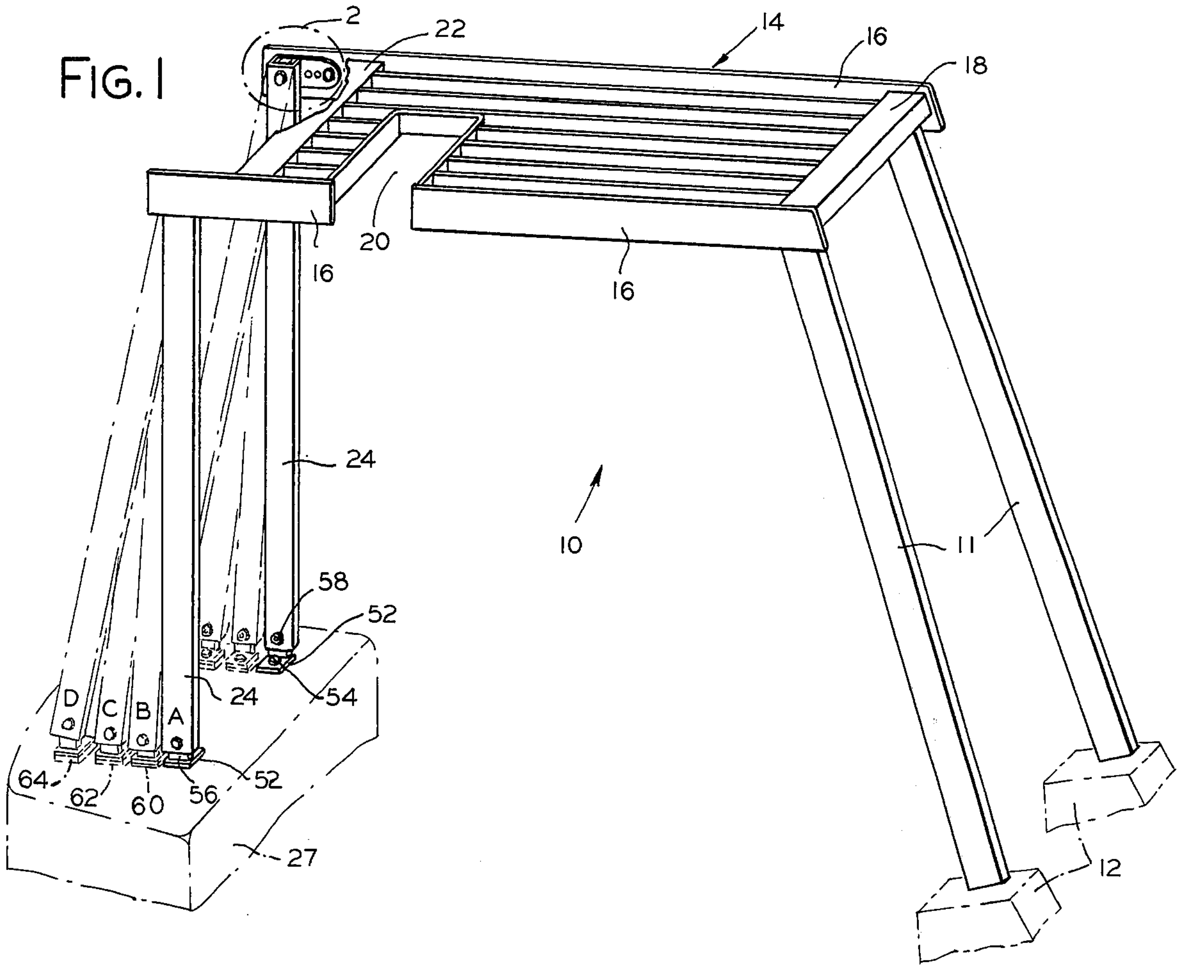
FIG. 1 is a perspective view of the driver's overhead guard shown connected to the forward and counterweight portions of a lift truck or other industrial type vehicle and wherein a plurality of adjustment positions of the rear leg portions of the guard are illustrated.
Figure 2:
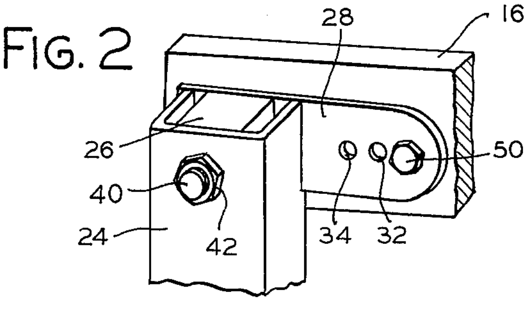
FIG. 2 is an enlarged partial view of one upper rear corner portion of the guard showing the relative positions of the one rear leg and guard side rail in one position of adjustment.

Although my invention is applicable to any suitable industrial type vehicle having a need therefore, it is particularly suited for lift truck applications which will be referred to hereinafter for convenience. The guard assembly 10 includes a pair of rigid forward guard legs 11 secured to truck mounting posts shown in broken lines at 12, an overhead guard canopy grid assembly 14 extending over an operator's compartment in the usual manner having a pair of side rails 16 connected rigidly to forward legs 11 and having a front reinforcing structural member 18 with a U-shaped open pocket portion 20 and a transverse reinforcing structural member 22 adjacent the rear end of the side rails which is adapted to be connected by a pair of downwardly extending rigid pivotal structural leg members 24 to any one of a plurality of counterweights or to a single longitudinally adjustable counterweight for various size trucks and/or battery compartments. The adjustable and, alternatively, multiple counterweights, for convenience of illustration, are represented at 27 simply by the broken lines of a counterweight.

Each leg 24 comprises preferably a rigid hollow box beam having secured at the upper end thereof a block member 26 and a longitudinal plate member 28 having three spaced openings 30, 32 and 34 therein. An opening 36 extends through the upper end of leg 24, block 26 and plate 28 for registry with a pivot post 38 having a threaded end 40 for receiving a nut 42, post 38 being rigidly secured, as by welding, at its one end to the end of the respective side rail 16.

Figure 3:
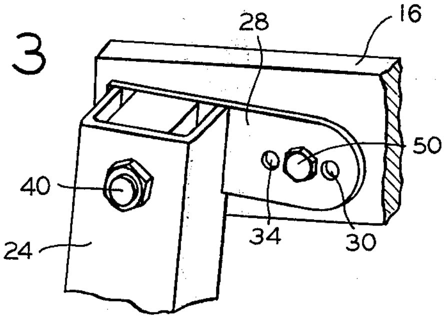
FIG. 3 is similar to FIG. 2 and shows a second position of adjustment.
Figure 4:
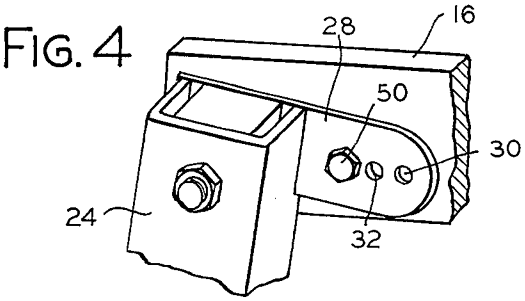
FIG. 4 is similar to FIG. 2 and shows a third position of adjustment.
Figure 5:
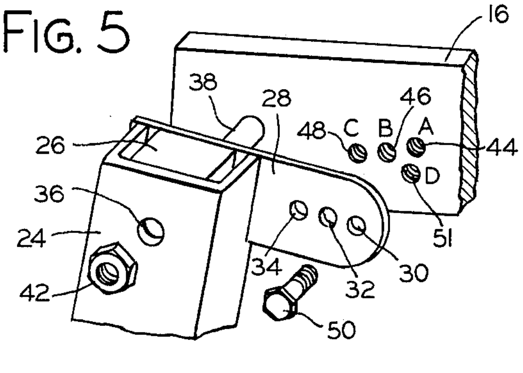
FIG. 5 is an exploded view of the one upper rear corner portion in which the parts are aligned for a fourth position of adjustment.

A plurality of threaded openings 44, 46, 48 and 51 are so located in the rear portion of each side rail 16 that when located in registry with respective ones of openings 30, 32 and 34 the adjustment positions of leg 24 as illustrated by letters A, B, C and D, may be effected. The threaded openings 44, 46, 48 and 51 have been numbered in a sequence corresponding to the letter sequence A, B, C and D denoting the said pivotal positions of legs 24. For example, to secure each leg 24 in position A the leg is pivoted on post 38 to align axially openings 30 and 44 and a threaded bolt 50 is inserted to secure plate 28 to side rail 16 in that position. Maximum rearward pivotal adjustment of the legs, as shown, is effected by pivoting leg 24 on post 38 to align openings 30 and 51 tightening nut 42 and inserting and tightening bolt 50 in said openings, thereby effecting rigid leg position D. Intermediate pivotal positions B and C are effected by aligning and securing pairs of openings 32, 46 and 34, 48, respectively, as shown in FIGS. 3 and 4.

The bottom of each leg 24 may be suitably secured in any one of its various adjustment positions by an angle bracket 52 which may be secured to any one of a number of counterweights for different length trucks, or to a single counterweight securing leg 24 adjustable to various longitudinal positions on a single truck. This may be done simply by selectively locating a stud 54 on a respective counterweight and securing leg 24 to the vertical post portion 56 of each bracket by a bolt and nut 58 which extends through alignable openings in leg 24 and post 56. The same bracket 52 may be used in each of the four adjustment positions illustrated while being capable of alignment with the openings for reception of bolt and nut 58 by the use of shims 60, 62 and 64 of various predetermined thicknesses to effect such alignment in each of the positions B, C and D, the construction being such, of course, that studs 54 are adapted to connect each combination of bracket and shim to the respective counterweight or adjusted counterweight position in the range of truck capacities and/or truck battery compartment length as may be involved for the same or different lift trucks. Of course, it will also be appreciated that the same construction is applicable to a variety of types of lift trucks or other industrial vehicles having prime movers other than electric, such as internal combustion engines.

My invention provides, as will now be appreciated, structurally rigid design of relatively high strength for adjustable overhead guards. It will be apparent to those skilled in the art that various changes in the structure and relative arrangement of parts may be made without necessarily departing from the scope of my invention.

I claim:

1. In an industrial vehicle having an operator's compartment and a driver's overhead guard of generally inverted U-shaped construction connected to the vehicle forwardly and rearwardly of the compartment, the improvement comprising a downwardly extending end support leg means pivotably connected at the upper end to one end portion of the overhead bridge of the guard and adjustable to a plurality of pivoted positions in relation to the bridge and to the vehicle, means secured to the upper end of the support leg means which extends outwardly therefrom contiguous to said one end portion of the bridge, and means for connecting said secured means to said contiguous one end portion at a location spaced from said pivotal connection at each position of said plurality of pivoted positions of said support leg means.

2. An industrial vehicle as claimed in claim 1 wherein said vehicle is a lift truck, said overhead guard being connected rearwardly of the compartment to a counterweight of the lift truck by said support leg means, and bracket means for securing said support leg means to the counterweight.

3. An industrial vehicle as claimed in claim 1 wherein said connecting means comprises a plurality of spaced and selectively alignable openings in said secured means and in the contiguous one end bridge portion, and a member for securely connecting selected pairs of said openings.

4. An industrial vehicle as claimed in claim 1 wherein the support leg means is of fixed length, and vertically adjustable connecting means for securing the lower ends of the support leg means to the vehicle at different pivoted adjusted positions thereof.

5. An industrial vehicle as claimed in claim 1 wherein a pivot post is secured to the said one end portion of the bridge from which is pivotally supported the support leg means, said pivot post being in spaced relation to said connecting means.

6. An industrial vehicle as claimed in claim 1 wherein said support leg means comprises a pair of downwardly extending legs to each of which is connected a said connecting means for connecting the upper ends of the support legs to opposite side rails of said one portion of the bridge, and means for securing the lower ends of the support legs to the vehicle.

7. An industrial vehicle as claimed in claim 6 wherein the portion of the vehicle to which the support legs are secured is adjustable longitudinally to a plurality of positions wherein each support leg is pivotally adjustable for rigid non-pivotable connection at both ends thereof.

8. A driver's overhead guard of generally inverted U-shaped construction adjustable for use with industrial vehicles of different lengths having corresponding different length requirements for an overhead guard, the improvement comprising downwardly extending support leg means pivotally connected at the upper end to one end portion of the overhead bridge of the guard and adjustable to a plurality of pivoted positions, means secured to the upper end of the support leg means which extends outwardly therefrom contiguous to said one end portion of the bridge, means for connecting said secured means to said contiguous one end portion at a location spaced from said pivotal connection at each position of said plurality of pivoted positions of said support leg means, and means for securing the lower end of said support leg means to a respective vehicle for which a selectable pivoted position of the support leg means is provided.

9. A driver's overhead guard as claimed in claim 8 wherein the support leg means is of a fixed length and the means for securing the latter to the vehicle varies in height in relation to the selected pivoted position of the support leg means.

10. A driver's overhead guard as claimed in claim 8 wherein a pivot post is secured to the said one end portion of the bridge from which is pivotally supported the support leg means, said pivot post being in spaced relation to said connecting means.

11. A driver's overhead guard as claimed in claim 8 wherein the overhead bridge of the guard has a pair of transversely spaced side rails, said support leg means comprising a pair of support legs pivotally connected to respective ones of said side rails, said secured means comprising a pair of securing elements, a plurality of selectively spaced alignable openings in each side rail and securing contiguous element, and a member for securing each contiguous element and side rail at selected pivoted positions of each support leg by connecting selected alignable pairs of said openings.

12. A driver's overhead guard as claimed in claim 11 wherein the support legs are fixed in length, and bracket means for securing the lower ends thereof to different ones of said vehicles.

* * * * *